April 19, 1932.
G. C. LEWIS
1,854,205
PRODUCTION OF HYDROCARBON COMPOUNDS FROM NATURAL GAS
Filed Aug. 8 1928
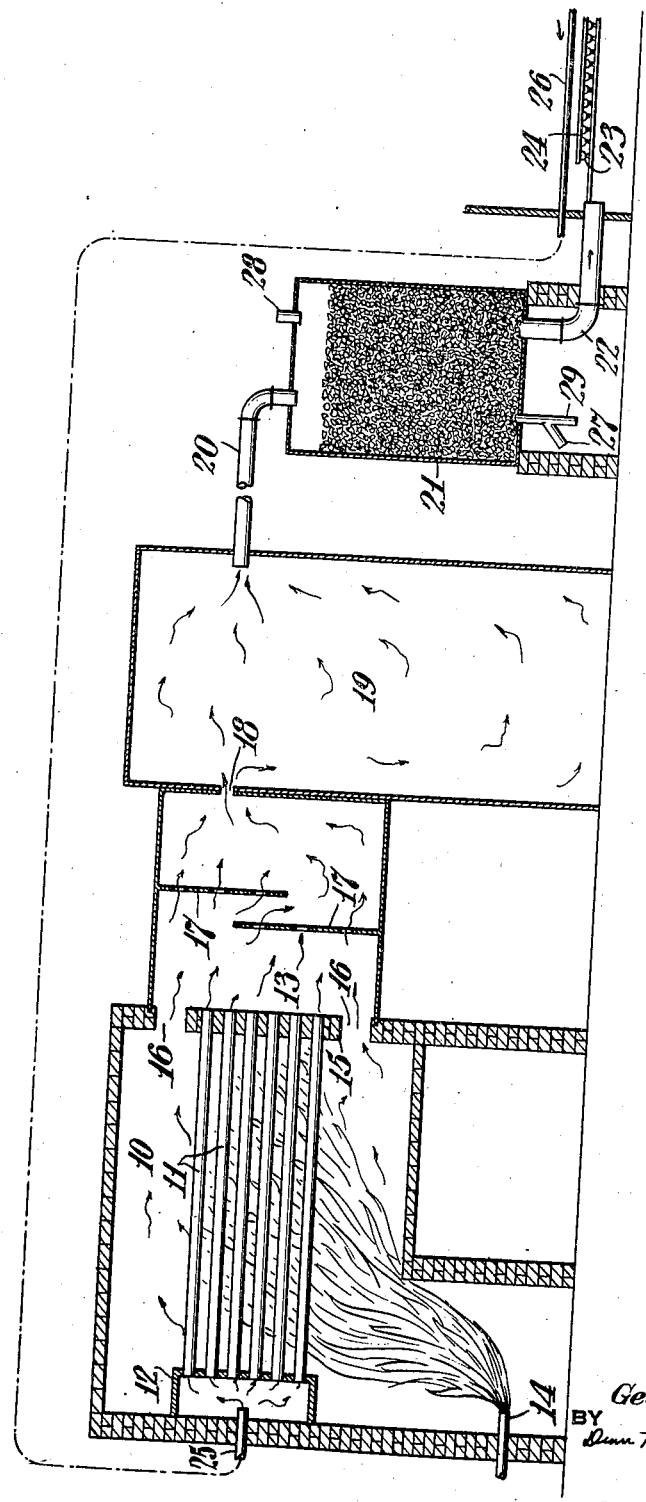
INVENTOR
George C. Lewis
BY
ATTORNEYS Patented Apr. 19, 1932

1,854,205

UNITED STATES PATENT OFFICE

GEORGE CHARLES LEWIS, OF NEW DORP, NEW YORK, ASSIGNOR TO COLUMBIAN CARBON COMPANY, OF NEW YORK, N. Y., A CORPORATION OF DELAWARE

PRODUCTION OF HYDROCARBON COMPOUNDS FROM NATURAL GAS

Application filed August 8, 1928. Serial No. 298,153.

This invention relates to certain improvements in the treatment of natural gas, and more particularly to a heat treatment whereby there may be produced benzol as a result of the polymerization and decomposition of the methane.

It is known that when methane is heated to a very high temperature it may be decomposed into carbon, and hydrogen, and that if heated to a somewhat lower temperature there are produced various products, such as benzol, anthracene, naphthalene, and other cyclic compositions.

The main object of my invention is to so treat the gas that there is produced a better yield of benzol and a smaller yield of anthracene, naphthalene, etc.

As one important result of the main step of my improved process, the gases remaining after the production and extraction of the benzol when burned by the impingement process, produce increased yield of carbon black and a more variable form of carbon black.

As the important feature of my process I burn a portion of the natural gas to produce heat for raising the temperature of the remaining portion, and mix the products of combustion of the first mentioned portion directly with the second mentioned portion.

As a preferred proportioning I burn one volume of natural gas to heat ten volumes, whereby the resulting products of combustion of the one part approximately equal in volume the ten parts which are heated.

As an important step the gas is preheated before being delivered to the chamber where it is heated by burning a portion of the natural gas, and as a further preferred feature the gas in being heated by the combustion is delivered through a series of parallel tubes. The heated gases, plus the products of combustion, are thoroughly mixed, then expanded and cooled, and thereafter subjected to the action of a suitable adsorber which will remove the benzol.

In the accompanying drawing I have illustrated somewhat diagrammatically one embodiment of an apparatus designed for carrying out my invention, and which apparatus embodies certain structural features of my invention. The drawing shows the apparatus in vertical longitudinal section.

In the construction illustrated there is provided a furnace 10 through which extend a series of tubes 11 in which the gas is heated. These tubes are connected to a header or inlet chamber 12 and deliver to a mixing chamber 13. Natural gas which has been preheated preferably to about 240° to 250° C. is delivered through these tubes.

Below the tubes there is disposed a suitable burner 14 in which natural gas is burned and the products of combustion pass around the tubes 11 to heat the latter. The tubes at their delivery end may be supported in a wall 15 of the furnace, and this wall has ports 16 above and below the tubes, whereby the products of combustion may pass directly into the mixing chamber which receives the heated gas from the tubes. Thus the natural gas is not only heated while in the tubes, but is directly heated by and intermixed with the products of combustion of the gas which was used for heating the tubes. As previously noted, the relative volumes of gas are preferably about ten parts of natural gas through the tubes, and about one part of natural gas to the burner. The products of combustion of this gas, together with the nitrogen entering with the air which supports the combustion, makes the volume of the products of combustion substantially equal to the volume of the gases passing through the tubes.

The mixing chamber preferably has baffles 17 whereby thorough intermixing of the gases is effected. The gases pass from the mixing chamber through a port 18 to an expansion chamber 19 in which they are cooled, but not to the point at which the hydrocarbon products of the heating and intermixing action are deposited. The gases then pass through a conduit 20 to an adsorption chamber 21 in which the benzol is removed. The adsorbing agent is preferably charcoal and the gases preferably enter the top of the chamber and leave through a conduit 22 at the bottom. The entrance to this last mentioned conduit may have a suitable screen to prevent the passage of the charcoal thereinto.

The gases are delivered from the conduit 22 to suitable burners 23 in the burner house, where the flames impinge upon metal plates 24 to form carbon black in the usual and well-known manner. The gases which are delivered to the furnace tubes through the conduit 25 are preferably preheated by passing through a conduit 26 in the burner house, and juxtaposed to the plates 24. Thus the waste heat in the burner house is utilized for the preheating of the gas before it is delivered to the tubes 11.

There are preferably two of the adsorbing chambers 21 which are arranged in parallel so that the gas may be delivered from the conduit 20 to first one and then the other, and both such chambers are connected to the delivery pipe 22. Thus, while the benzol is being adsorbed in one it may be removed from the other. For removing the benzol from the adsorbent I preferably deliver steam through a steam pipe 27 to the lower portion of the chamber, and take off the steam and benzol vapors through a pipe 28 at the top, which pipe may be connected to a suitable condenser for the condensation of the benzol. The bottom of the chamber may have a water drain 29 from which any water condensing in the chamber may be removed.

As a result of my improved process, the natural gas is heated to the desired temperature, which is between 500° C. and 750° C., and a portion of this heating is effected in tubes of comparatively small diameter, while the final heating is effected by the direct contact of the natural gas with the gases of combustion. I have discovered that by this form of heat-treating the natural gas, and mixing of hot products of combustion therewith, I am able to better control the temperature to which the natural gas is heated, and thereby prevent or retard the separation of free carbon which would result from heating the gas to too high a temperature, and to secure a better yield of benzol and a slighter tendency to form the less desirable products, such as anthracene and naphthalene.

I have also discovered that by the transformation of the natural gas by this heat treatment, and the removal therefrom of the benzol, the resulting mixture may be burned to produce a better and larger quantity of carbon black. This mixture is not a mixture of natural gas with the gases of combustion, but is a mixture of the by-products of the heat-treatment and the gases of combustion.

As the burning of the benzol will also produce carbon black, I may, in some cases, omit the adsorber and deliver the mixed gases with the vapors of benzol and other cyclic compounds therein directly to the burner, and secure a still higher yield or better quality of carbon black.

The pressure of the gas at the burners 23 is such as will produce a proper flame, and therefore the initial pressure in the conduit 26 should be sufficient to overcome the resistance of the adsorber and other parts defining the gas passage, or a blower may be interposed in the line to insure the proper pressure at the burners 23.

Having thus described my invention, what I claim as new and desire to secure by Letters Patent is:

1. The process of treating natural gas, which includes burning a portion of the gas to heat another portion, and mixing all of the products of combustion with all of the gases resulting from the heat-treatment of the second mentioned portion.

2. The process of treating natural gas, which includes burning a portion of the natural gas and utilizing the heat thereof for heating another portion of the natural gas, the heating being effected first indirectly and then by direct mixing.

3. The process which includes burning a gas to produce gases of combustion, heating natural gas by said products of combustion, and further heating it by intermixing the products of combustion therewith.

4. The process of treating natural gas, which consists in delivering the gas through a series of parallel tubes, burning another portion of natural gas, heating said tubes by the products of combustion, and mixing the products of combustion with the gases heated in said tubes.

5. The process of treating natural gas, which consists in delivering the gas through a series of parallel tubes, burning another portion of natural gas, heating said tubes by the products of combustion, mixing the products of combustion with the gases heated in said tubes, cooling the resulting mixture, and removing therefrom the resulting benzol.

6. The process of treating natural gas, which includes burning one portion of the gas to heat another portion, mixing the last mentioned portion with the products of combustion of the first mentioned portion, adsorbing from the mixture the resulting benzol, and burning the gas after removal of benzol to form carbon black.

7. The process of treating natural gas, which includes burning one portion of the gas to heat another portion, mixing the last mentioned portion with the products of combustion of the first mentioned portion, adsorbing from the mixture the resulting benzol, burning the gas after removal of benzol to form carbon black, and utilizing the waste heat from the forming of the carbon black to preheat the second mentioned portion of the gas.

8. The process of treating natural gas, which includes delivering natural gas through tubes to a mixing chamber, burning a gas to heat said tubes, delivering the products of combustion from said burning to said mixing chambers, subjecting the mixture to an absorbent to remove condensible products, and burning the remaining portion of the mixture to form carbon black.

9. The process of treating natural gas, which includes delivering natural gas through tubes to a mixing chamber, burning a gas to heat said tubes, delivering the products of combustion from said burning to said mixing chamber, and burning at least a part of the mixture to form carbon black.

Signed at New York, in the county of New York and State of New York this 6th day of August A. D. 1928.

GEORGE CHARLES LEWIS.